United States Patent

Katada et al.

[11] Patent Number: 6,104,303
[45] Date of Patent: Aug. 15, 2000

[54] BATTERY DETECTING DEVICE FOR A RADIO PAGER

[75] Inventors: Nobuyuki Katada, Tokyo; Tomoshi Sone, Shizuoka, both of Japan

[73] Assignee: NEC Corporation, Tokyo, Japan

[21] Appl. No.: 08/613,020

[22] Filed: Mar. 11, 1996

Related U.S. Application Data

[63] Continuation of application No. 08/145,333, Oct. 29, 1993, abandoned.

[30] Foreign Application Priority Data

Oct. 29, 1992 [JP] Japan .................................. 4-291004

[51] Int. Cl.[7] .................................................. G08B 21/00
[52] U.S. Cl. .............................. 340/636; 340/635; 320/2; 320/48; 429/97
[58] Field of Search ..................... 340/636, 635, 340/311.1; 429/97, 99, 100; 320/2, 48

[56] References Cited

U.S. PATENT DOCUMENTS

| | | | |
|---|---|---|---|
| 3,930,889 | 1/1976 | Ruggiero et al. | 429/97 |
| 4,628,243 | 12/1986 | Hodgman et al. | 320/48 X |
| 4,645,325 | 2/1987 | Inoue et al. | 307/64 X |
| 5,115,182 | 5/1992 | Ehmke et al. | 320/14 |
| 5,182,546 | 1/1993 | Shinbori et al. | 340/636 |
| 5,359,318 | 10/1994 | Asai et al. | 340/311.1 |

FOREIGN PATENT DOCUMENTS 3803310  8/1988  Germany .

OTHER PUBLICATIONS

Patent Abstracts Of Japan, vol. 12, No. 447 (E–685), Nov. 24, 1988 & JP–A–63 174285 (Kyushu Hitachi Maxxell) Jul. 18, 1988.

*Primary Examiner*—Daniel J. Wu
*Assistant Examiner*—Sihong Huang
*Attorney, Agent, or Firm*—Ostrolenk, Faber, Gerb & Soffen, LLP

[57] ABSTRACT

In a device applicable to a pager or similar electronic apparatus for detecting a thin disk-like primary battery which feeds power to a load circuit, a secondary battery is provided which is complementary to the primary battery. A receiving portion receives the primary battery and has a first contact terminal for contacting the positive electrode side of the battery, a second contact terminal for contacting the negative electrode side of the battery at one end and connected to ground at the other end, and a third contact terminal contacting the negative electrode side of the battery at one end. When the primary battery is inserted in the receiving portion in a predetermined orientation, a detecting unit determines that the battery is present on the basis of the contact of the second and third contact terminals via the negative electrode side of the battery.

2 Claims, 6 Drawing Sheets

BATTERY DETECTING DEVICE FOR A RADIO PAGER

This is a continuation of application Ser. No. 08/145,333 filed on Oct. 29, 1993 now abandoned.

BACKGROUND OF THE INVENTION

The present invention relates to an electronic apparatus powered by a battery and, more particularly, to a device advantageously applicable to a radio pager for determining whether or not a battery is present in the pager.

Miniature electronic apparatuses extensively used today are powered by batteries. Once a battery is set in the battery receiving portion of such an apparatus, a condition wherein it is set or not set, i.e., whether or not the battery is present cannot be seen from the outside. In the light of this, there have been proposed some approaches to determine whether or not a battery is present in the receiving portion without actually opening it. Japanese Patent Laid-Open Publication No. 174285, for example, discloses a battery detecting device implementing this kind of approach. However, the conventional battery detecting devices are operable only with a limited kind of battery and cannot surely detect a battery.

SUMMARY OF THE INVENTION

It is, therefore, an object of the present invention to provide a battery detecting device capable of surely detecting a battery when the battery is set in the receiving portion of an electronic apparatus.

It is another object of the present invention to provide an inexpensive and vibration-resistant battery detecting device.

In accordance with the present invention, a device for detecting a thin disk-like primary battery which feeds power to a load circuit has a secondary battery which is complementary to the primary battery. A receiving portion receives the primary battery and has a first contact terminal for contacting the positive electrode side of the battery, a second contact terminal for contacting the negative electrode side of the battery at one end and connected to ground at the other end, and a third contact terminal contacting the negative electrode side of the battery at one end. When the primary battery is inserted in the receiving portion in a predetermined orientation, a detecting unit determines that the battery is present on the basis of the contact of the second and third contact terminals via the negative electrode side of the battery.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
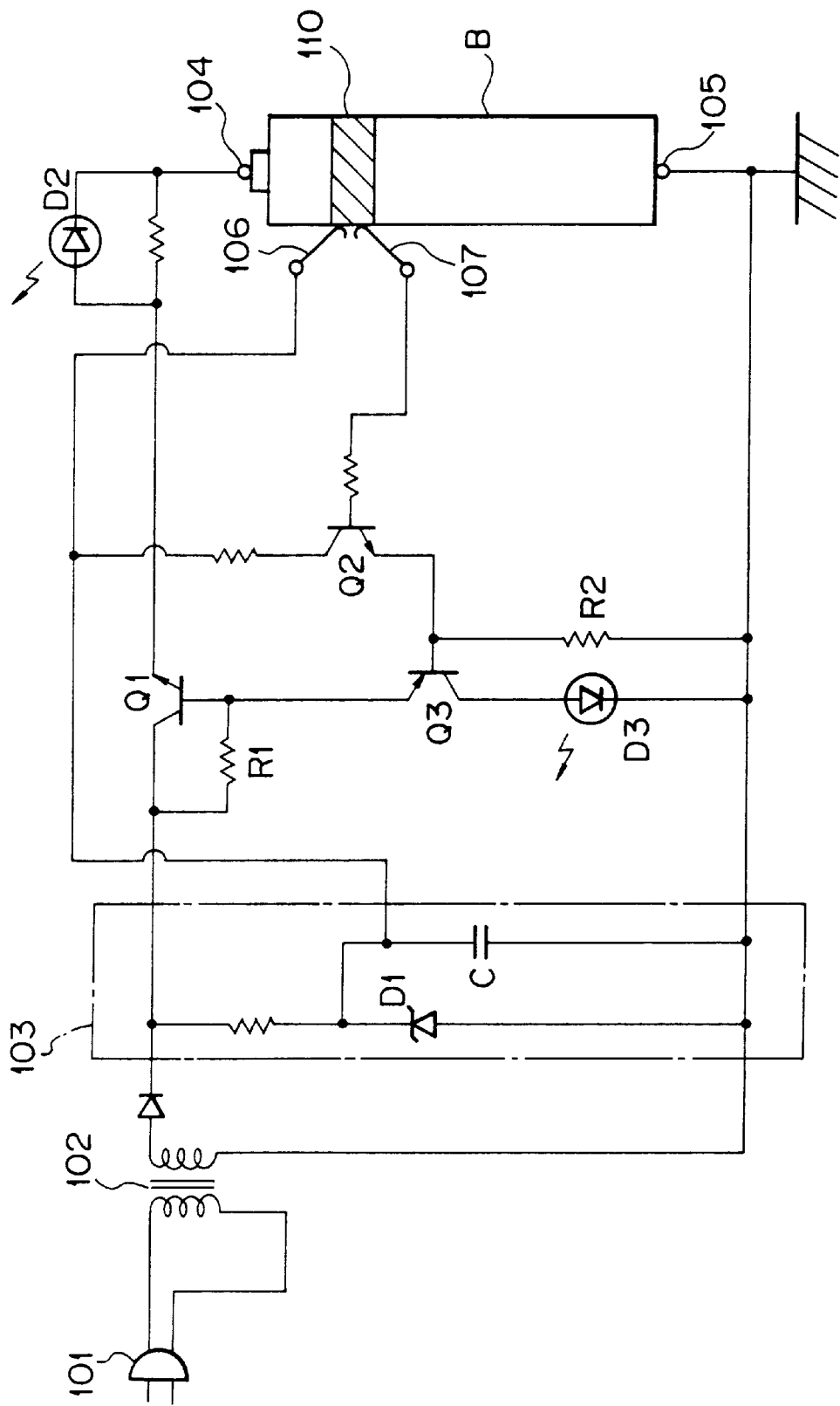
FIGS. 1 and 2 are circuit diagrams each showing a specific conventional battery detecting device.

To better understand the present invention, a brief reference will be made to a conventional battery detecting device for a radio pager, shown in FIG. 1. The device of FIG. 1 is of the type taught in previously mentioned Kokai No. 174285/1988 and implemented as a part of a charger for charging a battery. As shown, a chargeable battery B to be charged by the charger is cylindrical and provided with a conductive portion 110 on a part of the outer periphery thereof. The charger has a pair of contact portions 106 and 107 which contact the conductive portion 110 when the battery B is set on the charger. The battery B has a positive electrode 104 and a negative electrode 105. There are also shown in the figure a plug 101, a voltage lowering transformer 102, a constant voltage circuit 103 made up of a Zener diode D1 and a capacitor C, transistors Q1–Q3, light emitting elements D2 and D3, and resistors R1 and R2.

To charge the battery B, the battery B is set on a mounting portion included in the casing of the charger. Then, the contact portions 106 and 107 of the charger are brought into conduction via the conductive portion 110 of the battery. As a result, the charging circuit shown in FIG. 1 is driven by a conduction current to charge the battery B. When an unchargeable battery, i.e., a battery lacking the conductive portion 110 is inadvertently set on the charger, the contact portions 106 and 107 remain out of conduction, preventing the charger from charging the battery.

As stated above, the charger determines whether or not the battery B set thereon is chargeable by determining whether or not a conduction current flows between the contact portions 106 and 107. When the battery set on the charger is unchargeable, a current does not flow into the battery. Further, whether or not a conductive current flows between the contact portions 106 and 107 indicates whether or not the battery B is present on the mounting portion of the charger, thereby implementing a battery detecting device.

Figure 2:
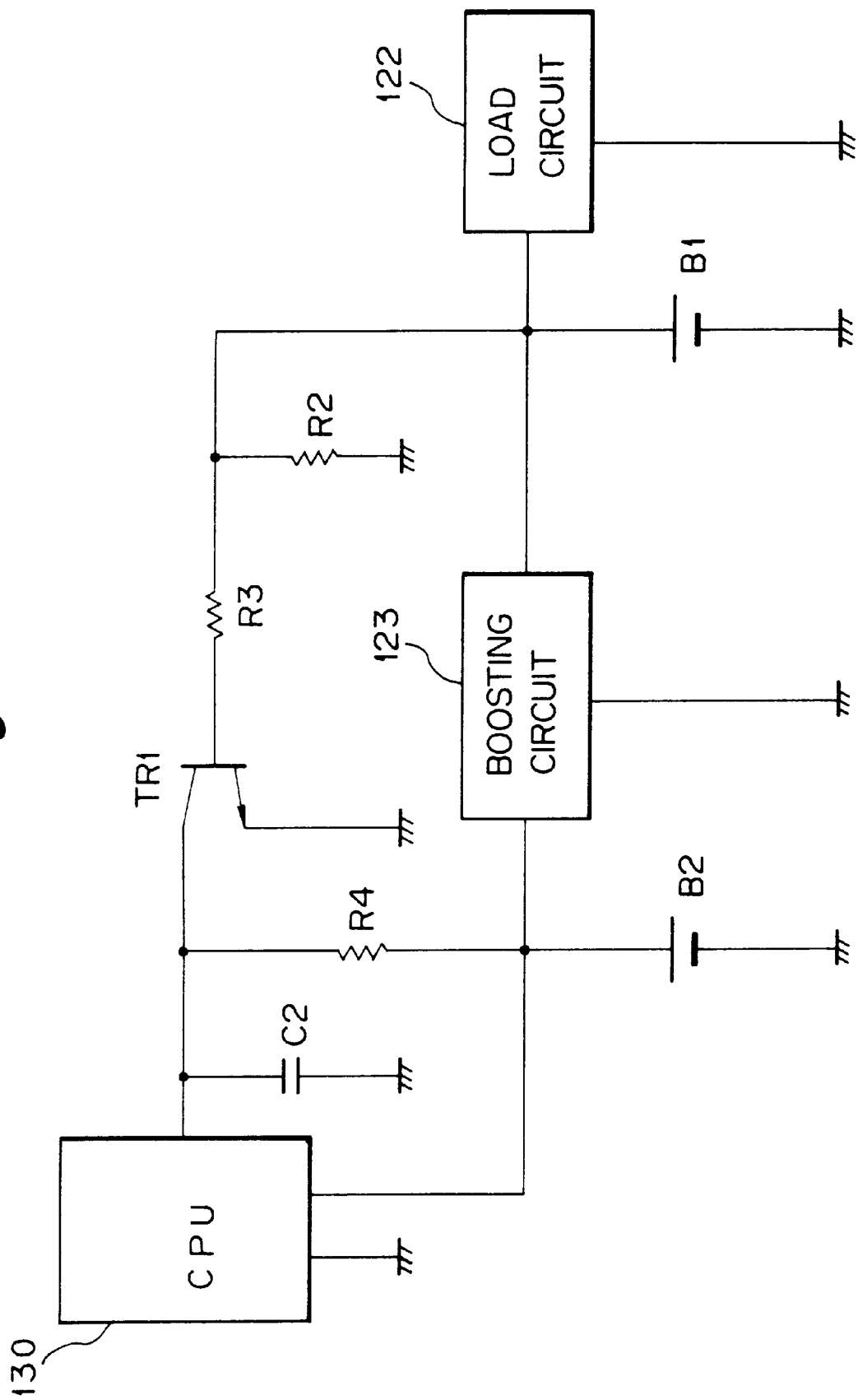

Another conventional battery detecting device is shown in FIG. 2. As shown, the device has a coin type primary battery $B_1$ for feeding power to a load circuit 122, a secondary battery $B_2$ complementary to the primary battery $B_1$, a boosting circuit 123, a pull-down resistor $R_2$, a current limiting resistor $R_3$, a pull-up resistor $R_4$, a capacitor $C_2$ for preventing chattering, a transistor $TR_1$, and a CPU (Central Processing Unit) 130. The transistor $TR_1$ monitors the output voltage of the primary battery $B_1$ and constantly reports whether or not the battery $B_1$ is present to the CPU 130.

In the charger shown in FIG. 1, the battery detecting device built therein is implemented by the conductive portion 110 of the battery B, and the contact portions 106 and 107, as stated above. When the contact portions 106 and 107 are brought into conduction via the conductive portion 110, the device determines that the battery B is present in the mounting portion. With this kind of scheme, however, it is difficult to provide the conductive portion 110 on a coin type, i.e., thin disk-like primary battery, as distinguished from the cylindrical battery B. Therefore, the shape of the battery which the device can detect is limited.

The device shown in FIG. 2 has the following drawback. As the load circuit 122 sequentially consumes current, the output voltage of the coin type primary battery $B_1$ falls. When the duration of the fall of this output voltage exceeds a time constant determined by the capacitor $C_2$ and resistor $R_4$, the CPU 130 determines that the battery $B_1$ is absent despite that it is present.

Figure 3:
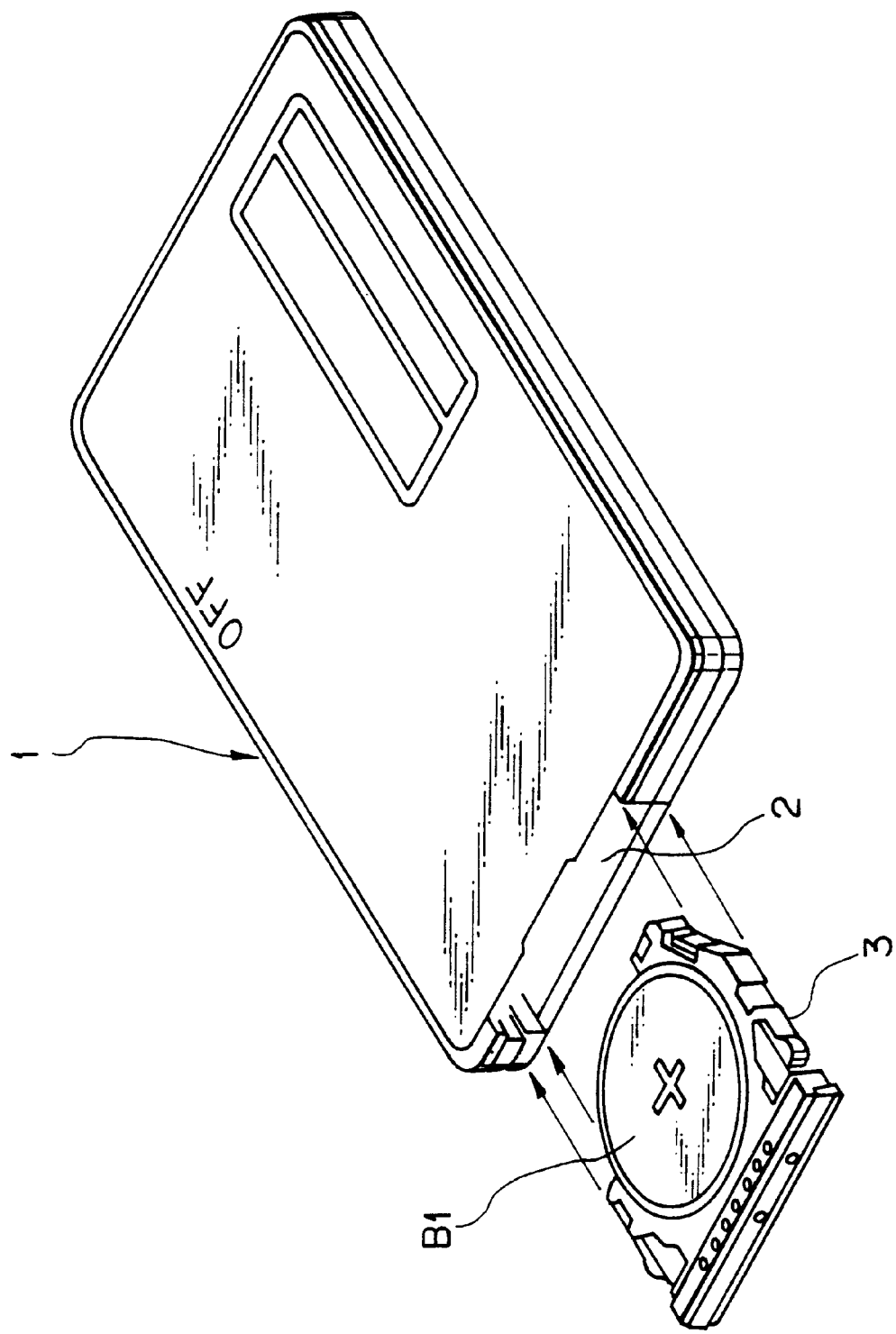
FIG. 3 is a perspective view of a radio pager to which a battery detecting device embodying the present invention is applicable.

Referring to FIG. 3, an electronic apparatus to which a battery detecting device embodying the present invention is applicable is shown and implemented to a radio pager 1 by way of example. As shown, the pager 1 has a battery holder 3 loaded with a thin disk-like primary battery $B_1$, and a cavity 2 for receiving the battery holder 3.

Figure 4:
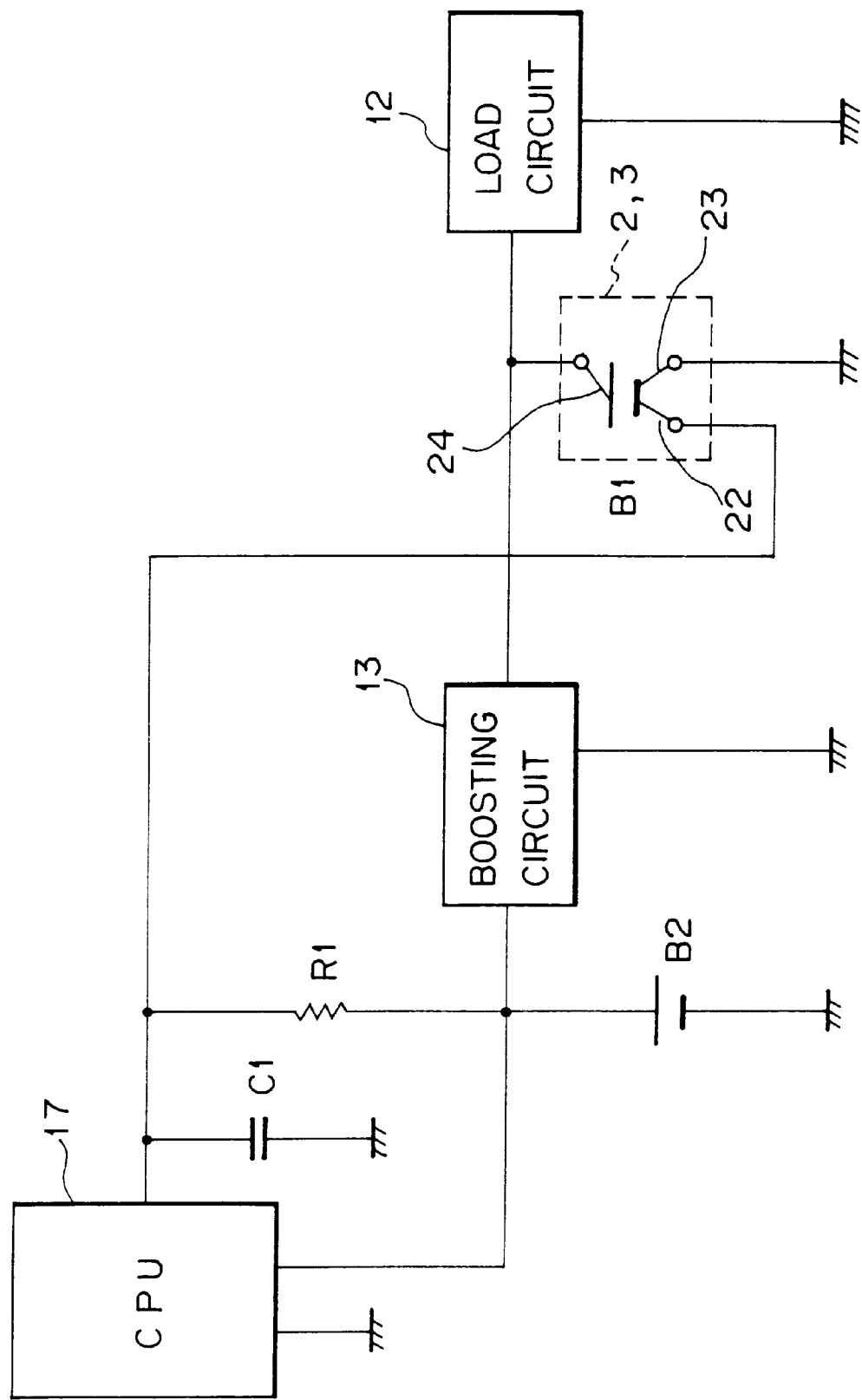
FIG. 4 is a block diagram schematically showing the embodiment.
Figure 5A:
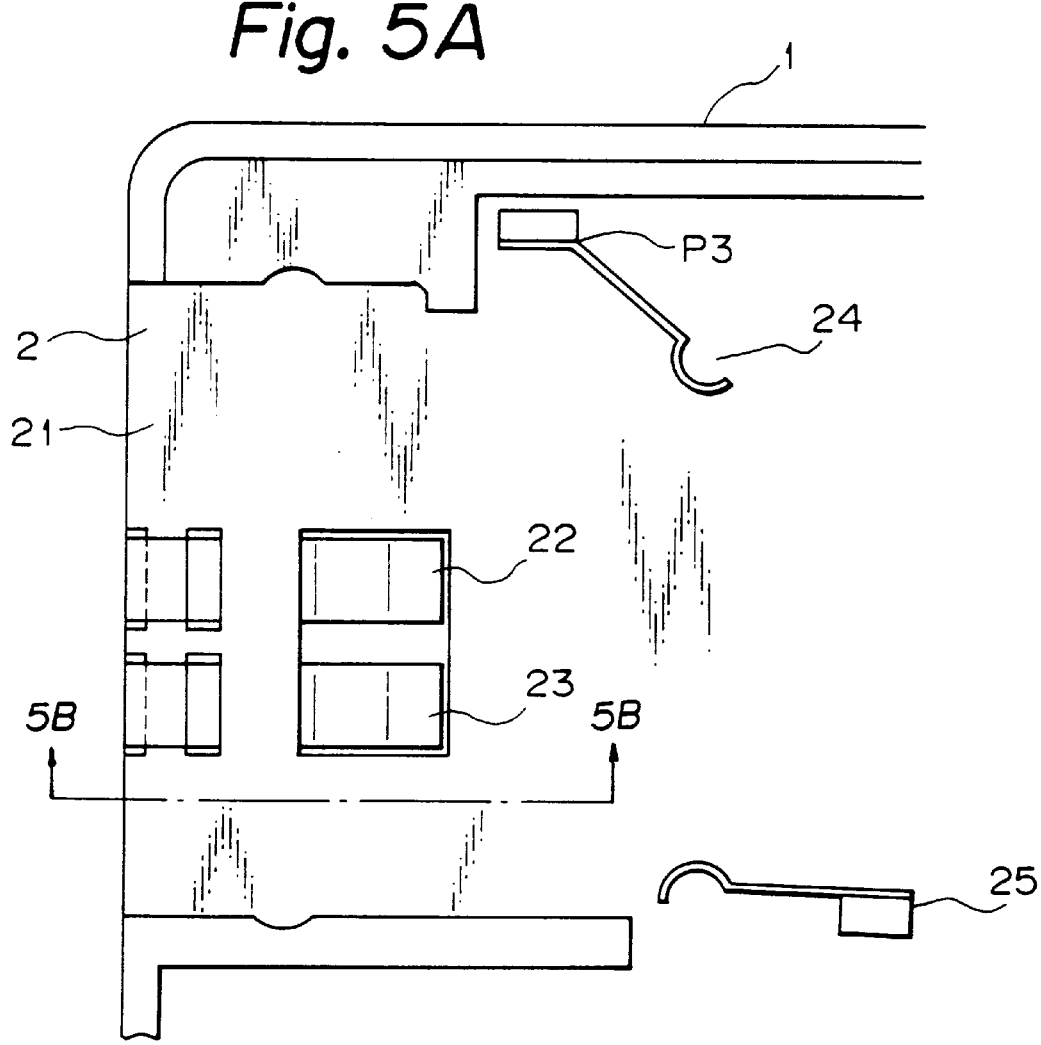
FIG. 5A is a plan view of a portion for accommodating a primary battery particular to the embodiment.
Figure 5B:
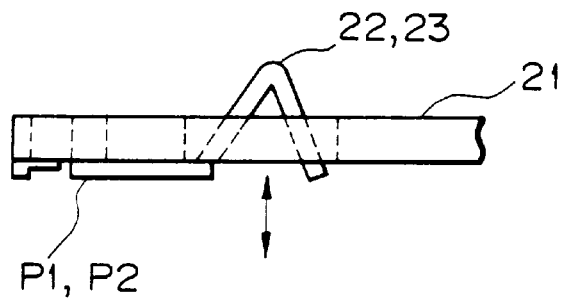
FIG. 5B is a section along line A–B of FIG. 5A.

FIG. 4 shows the circuit arrangement of the embodiment. As shown, the primary battery $B_1$ feeds power to a load circuit 12 and is complemented by a secondary battery $B_2$. When the primary battery $B_1$ is absent in the cavity 2, a boosting circuit 13 boosts the voltage of the secondary battery $B_2$ and applies the boosted voltage to the load circuit 12. A contact terminal 24 contacts the positive electrode side of the primary battery $B_1$ when the holder 3 is received in the cavity 2. A contact terminal 23 contacts the negative electrode side of the battery $B_1$ at one end thereof and is connected to ground at the other end. A contact terminal 22 contacts the negative electrode side of the battery $B_1$ at one end thereof. When a ground signal appears on the other end of the contact terminal 22, a CPU 17 determines that the battery $B_1$ has been set in the cavity 2 of the pager 1. There are also included in the circuitry a capacitor $C_1$ for eliminating chattering when the battery $B_1$ is inserted into the cavity 2, and a pull-up resistor $R_1$.

FIGS. 5A, 5B, 6A and 6B show the configurations of the cavity 2 and battery holder 3 specifically. As shown, the battery holder 3 is formed with a rectangular hole 31 in a part thereof where the primary battery $B_1$ will be positioned. The hole 31 allows the contact terminals 22 and 23 to contact the negative electrode side of the battery $B_1$ therethrough. A printed circuit board 21 is fixed in place in the cavity 2. The contact terminals 22 and 23 are supported by the circuit board 21 at fulcrums $P_1$ and $P_2$, respectively. When the battery holder 3 is received in the cavity 2, the hole 31 of the holder 3 aligns with the contact terminals 22 and 23. The fulcrums $P_1$ and $P_2$ are each implemented by a conductive resilient member. The contact terminal 24 to contact the positive electrode side of the battery $B_1$ is supported by the circuit board 21 at a fulcrum $P_3$ which is also implemented by a conductive resilient member. The reference numeral 25 designates a retaining spring for retaining the battery holder 3.

Figure 6A:
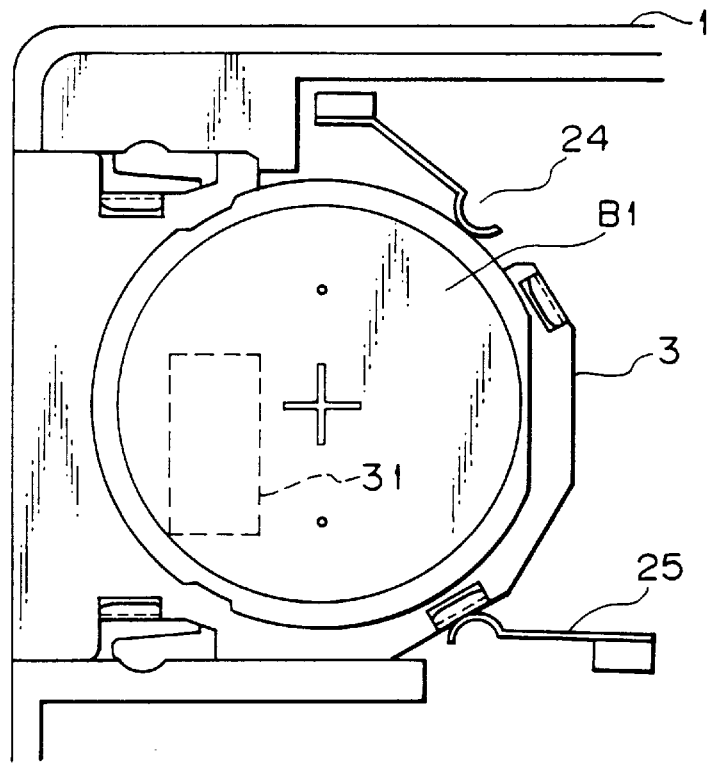
FIG. 6A shows a battery holder received in the portion of FIG. 5A in a correct orientation.

As shown in FIG. 3, to load the pager 1 with the primary battery $B_1$, the battery $B_1$ is set in the battery holder 3. Then, the battery holder 3 is inserted into the cavity 2, as shown in FIG. 6A. In this condition, the resilient contact terminals 22 and 23 contact the negative electrode side of the battery $B_1$ through the hole 31 of the battery holder 3, while the resilient contact terminal 24 contacts the positive electrode side of the battery $B_1$. As a result, a ground signal appears on the contact terminal 22 and informs the CPU 17 of the fact that the battery $B_1$ has been correctly mounted on the pager 1. The battery $B_1$ feeds power to the load circuit 12 via the contact terminal 24.

With the embodiment described above, it is not necessary to provide the primary battery B1 with the conventional conductive portion 110, FIG. 1. Moreover, since the CPU 17 determines whether or not the battery B1 is present in response to a ground signal received via the contact terminal 22, the faulty detection of the battery B1 is eliminated which would otherwise be caused by the fall of the output voltage of the battery B1 ascribable to the load circuit 12.

Figure 6B:
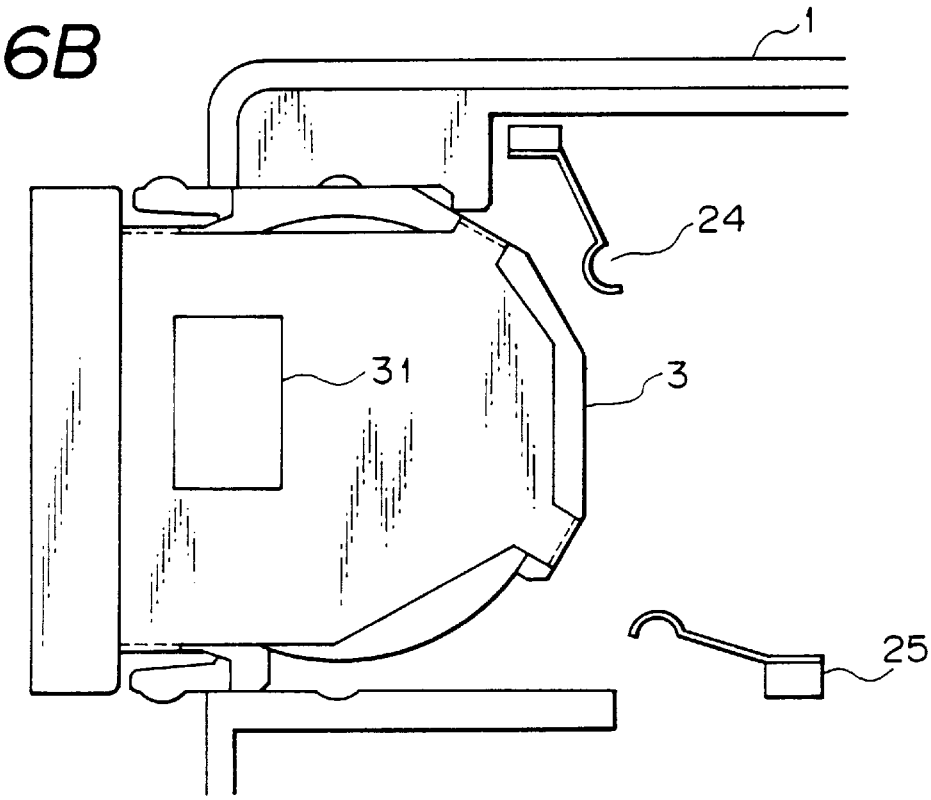
FIG. 6B shows the battery holder received in the same portion upside down.

Further, as shown in FIG. 6B, the embodiment is configured such that when the battery holder 3 is inserted into the cavity 2 upside down, none of the contact terminals 22, 23 and 24 contacts the battery B1.

In summary, it will be seen that the present invention provides a battery detecting device which makes it needless to provide a primary battery with an extra member for electric conduction and can surely detect the battery on the basis of a ground signal with no regard to a load current. In addition, the device of the present invention is inexpensive and vibration-resistant.

Various modifications will become possible for those skilled in the art after receiving the teachings of the present disclosure without departing from the scope thereof.

What is claimed is:

1. A device having a circuit for detecting the presence or absence of a battery properly connected to said device, comprising:

a battery holder for receiving a primary battery, the battery holder having first, second and third electrodes, the first electrode being connected to a load circuit, the second electrode being connected to ground, the battery holder being structured and arranged such that when the primary battery is received therein, the primary battery connects the third electrode to the second electrode to thereby connect the third electrode to ground; and a central processing unit connected to the third electrode of the battery holder for monitoring the presence or absence of ground at the third electrode and for stopping an operation of the device when the control processing unit determines the absence of ground at the third electrode.

2. A device, as claimed in claim 1, further including a secondary battery and a boosting circuit having an input connected to the second battery and an output connected to the load circuit and to the first electrode of the battery holder.

* * * * *